Nov. 22, 1927.                                               1,650,286
F. P. LIVINGSTON
AUTOMOTIVE BRAKE
Filed March 11, 1926
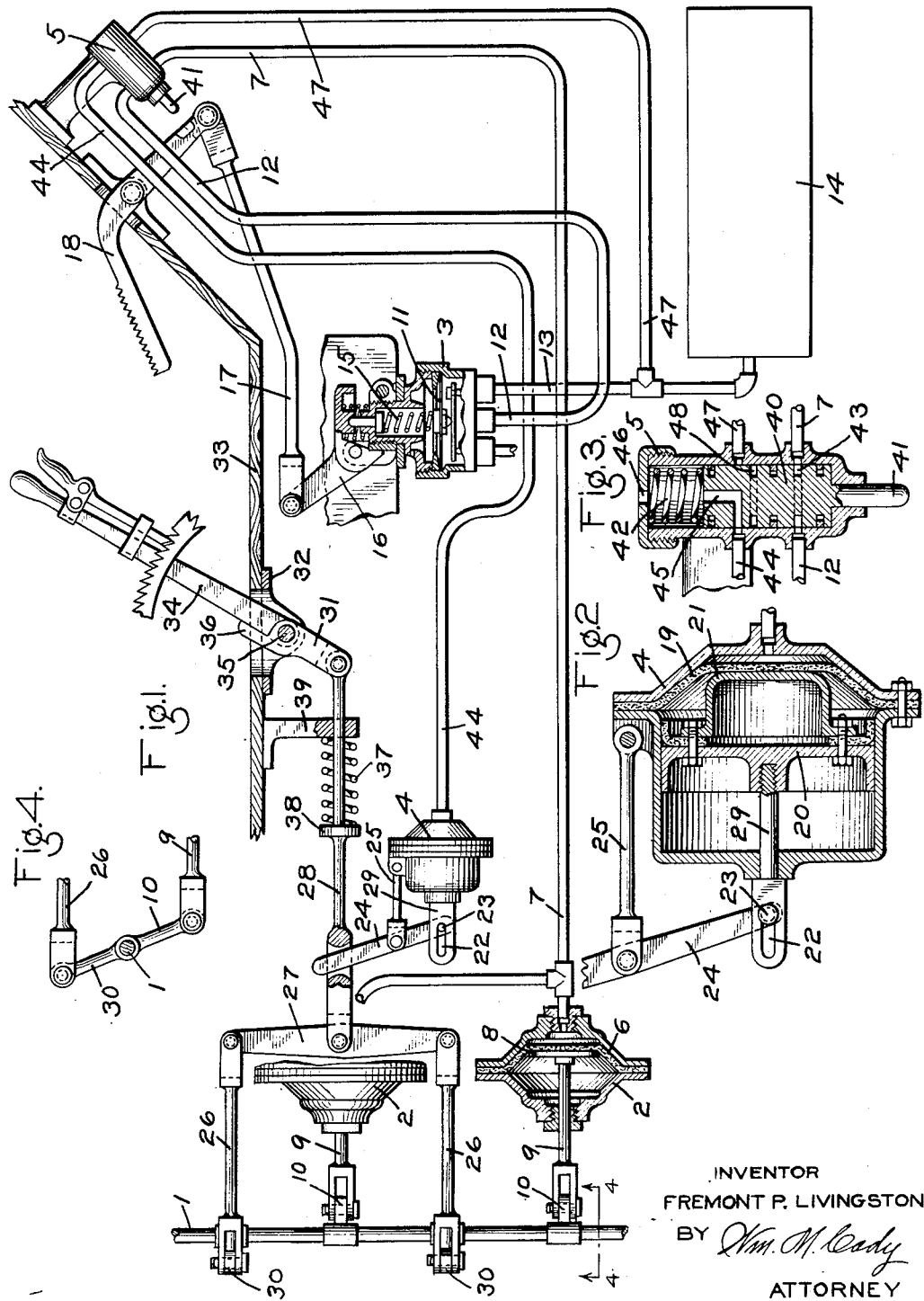
INVENTOR
FREMONT P. LIVINGSTON
BY Wm. M. Cady
ATTORNEY Patented Nov. 22, 1927.

1,650,286

UNITED STATES PATENT OFFICE.

FREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed March 11, 1926. Serial No. 93,878.

This invention relates to fluid pressure brakes, and more particularly to a fluid pressure brake adapted for motor vehicles.

The principal object of my invention is to provide an auxiliary fluid pressure brake apparatus which may be operated in case the main fluid pressure brake should fail to operate for any reason, such as by reason of a broken pipe or diaphragm.

In the accompanying drawing; Fig. 1 is a diagrammatic view of a vehicle brake equipment embodying my invention; Fig. 2 a sectional view of the auxiliary brake chamber; Fig. 3 a sectional view of the auxiliary controlling valve device; and Fig. 4 a section on the line 4—4 of Fig. 1.

As shown in Fig. 1, the brake equipment may comprise a shaft 1, the rotation of which is adapted to effect the application of the brakes, main brake chambers 2, operatively connected to the shaft 1, a brake valve device 3, for controlling the admission and release of fluid under pressure to and from the brake chamber 2, an auxiliary brake chamber 4, and an auxiliary controlling valve device 5.

Each main brake chamber 2 contains a flexible diaphragm 6, subject on one side to fluid under pressure as supplied through pipe 7, and having a pressure plate 8 engaging the opposite side. A diaphragm rod 9 is secured to the plate 8 and is pivotally connected to an arm 10 secured to the shaft 1.

The brake valve device 3 may comprise a diaphragm 11, the movement of which is adapted to operate valves (not shown) for controlling the admission and release of fluid under pressure to and from pipe 12, the brake valve being connected through pipe 13, with a source of fluid pressure supply, such as the reservoir 14. The diaphragm 11 is subject to the pressure of a coil spring 15, the compression of which is varied by the operation of a bell crank 16.

One arm of the bell crank 16 is connected to a rod 17 and said rod is connected to a pedal lever 18.

The auxiliary brake chamber 4 may comprise a casing containing a flexible diaphragm 19, with which a piston 20 is preferably associated.

Said piston is provided with a rearwardly extending pressure plate 21 which engages one side of the diaphragm 19. A piston rod 29 is connected to piston 20 and is provided with an elongated slot 22 in which works a pivot pin 23 carried by one end of a lever 24. The lever 24 is fulcrumed on a rod 25 which is pivotally secured to the brake chamber 4.

Secured to the shaft 1 are arms 30, to each of which a pull rod 26 is pivotally connected and the ends of said rods are pivotally connected to the ends of an equalizing lever 27. At an intermediate point, one end of a pull rod 28 is pivotally connected to the equalizing lever 27 and said rod is slotted to receive the end of the lever 24.

The other end of pull rod 28 is pivotally connected to a member 31 which is pivotally mounted on a bracket 32 secured underneath the vehicle floor boards 33.

A hand brake lever 34 is carried by the pivot pin 35 of the member 31 and is adapted, when pulled toward the left, to engage an extended portion 36 of the member 31, so that the member 31 will thereby be operated to shift the rod 28 toward the right. A coil spring 37 surrounds the rod 28 and is interposed between a collar 38 on the rod and a stop member 39 secured to the underside of the floor boards 33.

The auxiliary controlling valve device 5 comprises a casing containing a piston valve 40 having an operating stem 41 which extends out of the casing, the valve device 5 being so positioned underneath the floor boards that when the pedal lever 18 is sufficiently depressed, a portion of said lever will engage said stem. A spring 42 acts on piston valve 40 and tends to maintain the piston valve in its lowermost position, assisted by the weight of the valve piston.

In the lowermost position of the piston valve 40, a through port 43 connects pipes 7 and 12, so that the main brake chambers 2 are connected to the brake valve device 3, permitting fluid under pressure to be supplied to and released from said brake chambers by the operation of the brake valve device. In this position of the piston valve, pipe 44, through which fluid under pressure is supplied to and released from the auxiliary brake chamber 4, is connected to a port 45 in the piston valve 40, which port opens to the chamber above said valve. Said chamber being open to the atmosphere, by way of port 46, the auxiliary brake chamber 4 is connected to the atmosphere, in this position of the piston valve.

In the upper operating position of the piston valve 40, pipe 44 is connected, through a port 48 in the piston valve, with a pipe 47, which is connected to the fluid pressure supply pipe 13.

In operation, with the pedal lever 18 in release position, as shown in the drawing, the diaphragm 11 of the brake valve device is relieved of pressure of spring 15 and the exhaust valve (not shown) of the brake valve device is permitted to open, so that the main brake chambers 2 are connected to the exhaust by way of pipe 7, port 43 in piston valve 40 and pipe 12.

In order to make a fluid pressure brake application in the normal way, the pedal lever 18 is depressed, so that the spring 15 of the brake valve device 3 is compressed and the pressure of the spring, as so produced, acts on diaphragm 11. Said diaphragm is thereupon moved, so that the exhaust valve is closed and the fluid pressure supply valve (not shown) is opened.

Fluid under pressure is then supplied from the reservoir 14, through pipe 13 to pipe 12 and thence to the main brake chambers 2. The diaphragms 8 of the brake chambers 2 are thereupon actuated to rotate the arms 10 and the shaft 1, so that the brakes are applied. The arms 30 move toward the right, when the shaft 1 is rotated by operation of the diaphragms 6, and consequently the rod 28. The lever 24 is also moved, but as the pivot pin 23 is free to move in the slot 22, the piston rod 29 is not moved.

The movement of rod 28 merely effects the rotation of the member 31, without causing movement of the hand brake lever 34, so that the lever will not be thrown back, with possible chance of injuring the operator.

If, in operating the pedal lever to apply the brakes by fluid under pressure, as controlled by the brake valve device 3, the brakes should fail to apply for any reason, such as on account of a broken pipe or ruptured diaphragm in the brake chamber 2, the operator, when aware of the fact, may promptly obtain a brake application by further depressing the brake pedal. The stem 41 is then actuated to shift the piston valve 40, so as to cut off communication from pipe 7 to pipe 12 and open communication from the reservoir 14 to the auxiliary brake chamber 4 by way of pipe 47, port 48 in piston valve 40, and pipe 44. The diaphragm 21 and the piston 20 in the auxiliary brake chamber are then moved toward the left, so that the lever 24 operates through the rod 28, the equalizing lever 27 and the rods 26 to rotate the shaft 1 and thus cause the brakes to be applied.

While a brake chamber of the simple diaphragm type such as the brake chamber 2 might be employed as the auxiliary brake chamber, I prefer to employ a brake chamber such as shown, in which, if the diaphragm 19 should become ruptured, the brake would still be effective, since the piston 20 would in such case be subjected to the fluid pressure supplied to the diaphragm 19 and the piston would be operated to effect an application of the brakes.

The brakes may also be operated by hand, if the hand lever 34 be pulled toward the left, as will be evident. The spring 37 acts as a release spring, to return the parts to release position, when the brakes are released.

Having now described my invention, what I claim as new and desire to secure by Letters Patent, is:—

1. In a vehicle brake equipment, the combination with a manually operable member and a fluid pressure brake apparatus operated upon movement of said member for applying the brakes, of an auxiliary fluid pressure brake apparatus separately operated upon a further movement of said member for also applying the brakes.

2. In a vehicle brake equipment, the combination with a pedal lever and a fluid pressure brake mechanism operated by movement of said lever for effecting an application of the brakes, of an auxiliary fluid pressure brake apparatus operated independently of the first mentioned brake mechanism upon a further movement of said pedal lever for also effecting an application of the brakes.

3. In a vehicle brake equipment, the combination with a main brake chamber, valve means for controlling the direct supply of fluid under pressure to said brake chamber, and a manually operable member for operating said valve means, of an auxiliary brake chamber and valve means operated by said member for supplying fluid under pressure directly to said auxiliary brake chamber.

4. In a vehicle brake equipment, the combination with a main brake chamber, a manually operable member, and valve means operated upon movement of said member for supplying fluid under pressure to said brake chamber, of an auxiliary brake chamber and an auxiliary valve means independent of the first mentioned valve means and operated upon a further movement of said member for supplying fluid under pressure to said auxiliary brake chamber.

5. In a vehicle brake equipment, the combination with a main brake chamber, a manually operable member, and valve means operated upon movement of said member for supplying fluid under pressure to said brake chamber, of an auxiliary brake chamber and an auxiliary valve means operated by said member for cutting off communication through which fluid is supplied to the main brake chamber and for supplying fluid under pressure to the auxiliary brake chamber.

6. In a vehicle brake equipment, the combination with a brake valve device for controlling the brakes by fluid under pressure, of an auxiliary valve device for also controlling the brakes by fluid under pressure and a manually operable member for operating said valve devices.

7. In a vehicle brake equipment, the combination with a brake valve device for controlling the brakes by fluid under pressure, of a manually operable member movable to operate said valve device and an auxiliary valve device operated upon a further movement of said member for also controlling the brakes by fluid under pressure.

In testimony whereof I have hereunto set my hand.

FREMONT P. LIVINGSTON.